(12) United States Patent
Dent

(10) Patent No.: US 7,010,290 B2
(45) Date of Patent: Mar. 7, 2006

(54) SYSTEM AND METHOD OF DETERMINING SHORT RANGE DISTANCE BETWEEN RF EQUIPPED DEVICES

(75) Inventor: Paul W. Dent, Pittsboro, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 567 days.

(21) Appl. No.: 09/932,666

(22) Filed: Aug. 17, 2001

(65) Prior Publication Data

US 2003/0036378 A1    Feb. 20, 2003

(51) Int. Cl.
   *H04M 3/42* (2006.01)
(52) U.S. Cl. ............... 455/414.1; 367/128; 340/691.5; 379/90.01
(58) Field of Classification Search ............ 455/414.1, 455/414.4, 417, 452.2, 445, 552.1, 11.1; 367/128, 127, 2, 125; 340/691.5; 370/350; 379/90.01; 84/603; 704/233
   See application file for complete search history.

(56) References Cited

U.S. PATENT DOCUMENTS

| | | | |
|---|---|---|---|
| 4,313,183 A | | 1/1982 | Saylors |
| 4,746,912 A * | | 5/1988 | Clifford et al. .......... 340/691.5 |
| 5,541,354 A * | | 7/1996 | Farrett et al. ................ 84/603 |
| 6,201,802 B1 * | | 3/2001 | Dean .......................... 370/350 |
| 6,404,703 B1 * | | 6/2002 | Burrell ....................... 367/128 |
| 6,418,203 B1 * | | 7/2002 | Marcie .................... 379/90.01 |
| 6,662,020 B1 * | | 12/2003 | Aaro et al. .............. 455/552.1 |

| | | | |
|---|---|---|---|
| 2003/0005612 A1 * | 1/2003 | Andreason ................. 455/11.1 |

FOREIGN PATENT DOCUMENTS

| | | |
|---|---|---|
| EP | 1111949 | 6/2001 |
| FR | 2692363 | 12/1993 |
| WO | WO 91 10919 | 7/1991 |
| WO | WO 01 46916 | 6/2001 |

* cited by examiner

*Primary Examiner*—Fan Tsang
*Assistant Examiner*—Md S. Elahee
(74) *Attorney, Agent, or Firm*—Moore & Van Allen PLLC; Gregory A. Stephens

(57) ABSTRACT

A first, transmitting, device transmits a digitized data message using a short range radio link followed by digital data representing a digitized acoustic signal, such as a tone. Simultaneously, or with a predetermined time delay, the transmitting device emits an acoustic version of the same signal using an acoustic transducer such as a loudspeaker. A second, receiving, device receives the data message and the digitized acoustic signal via the short range radio link and receives the acoustic version of the signal via a microphone, which converts the acoustic signal to a second digitized version of the acoustic signal. Digital signal processing circuits then correlate the second digitized signal received acoustically with the digitized acoustic signal received over the short range radio link to determine a time difference of arrival. The time difference is corrected for any predetermined delay between the radio and the acoustic signal emissions at the transmitter and predetermined processing delays in the receiver. Once the time delay is determined, the receiving device can determine its distance from the transmitting device using the difference between the speed of sound and the speed of radio propagation.

8 Claims, 4 Drawing Sheets

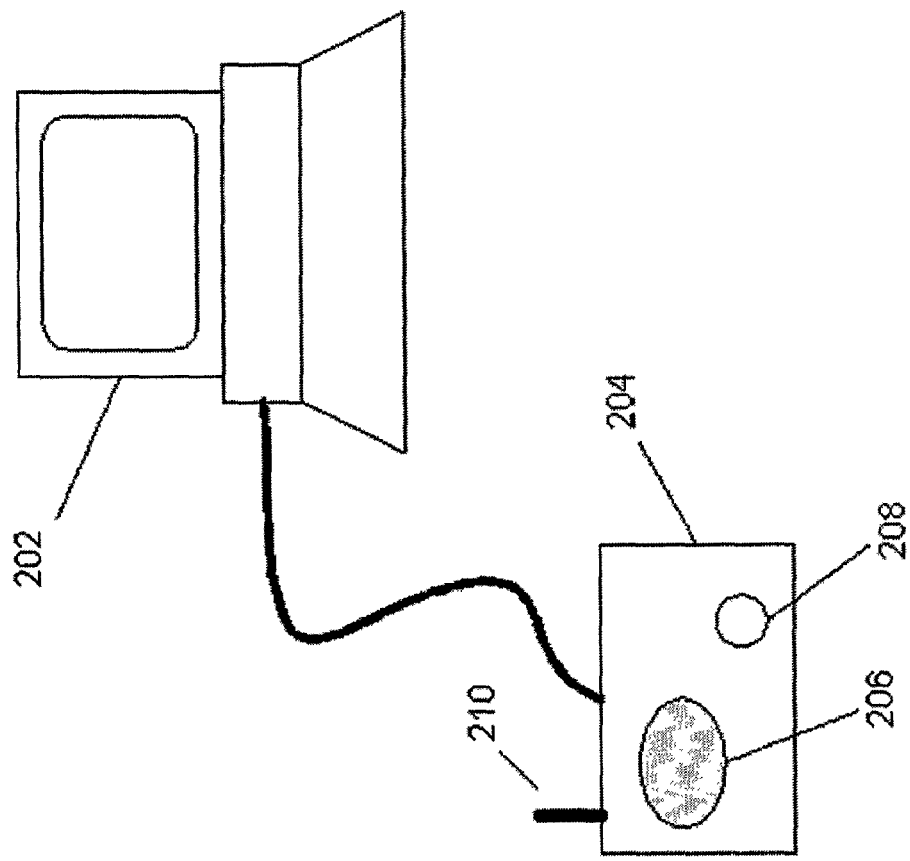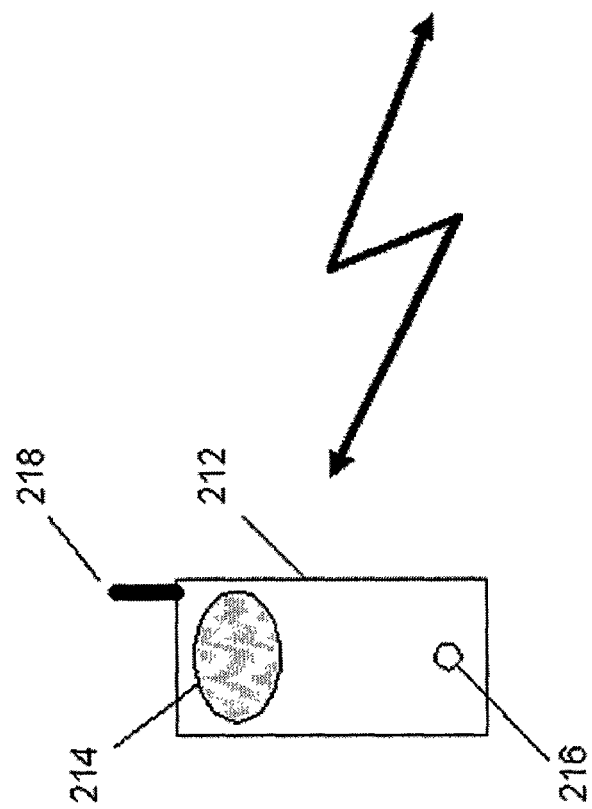
FIG. 2

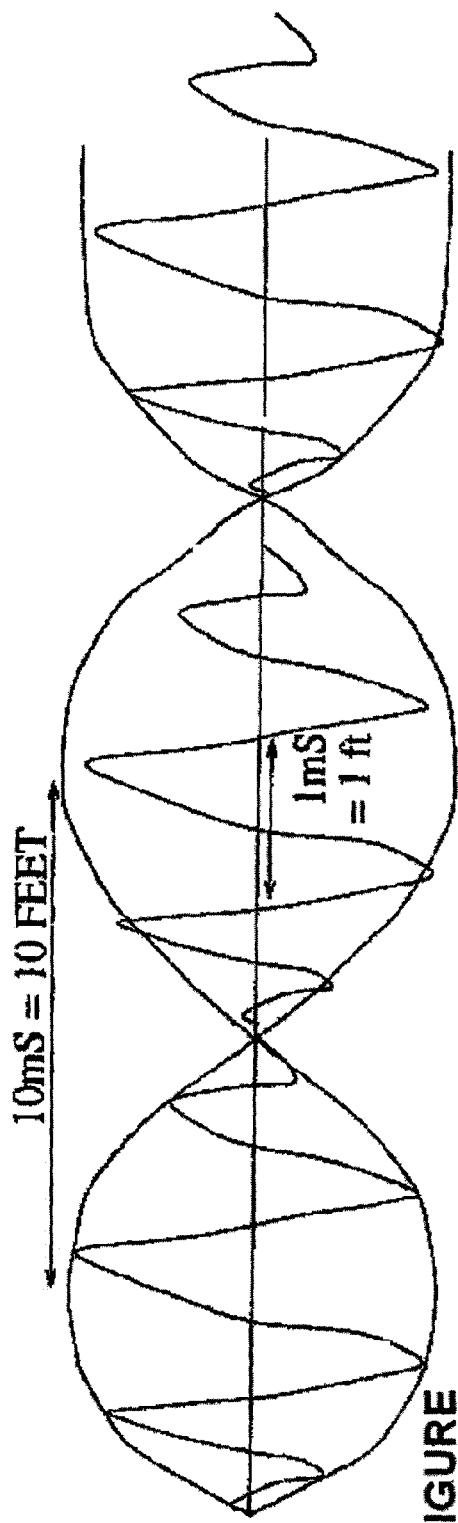
FIGURE 4A: A TWO-TONE WAVEFORM
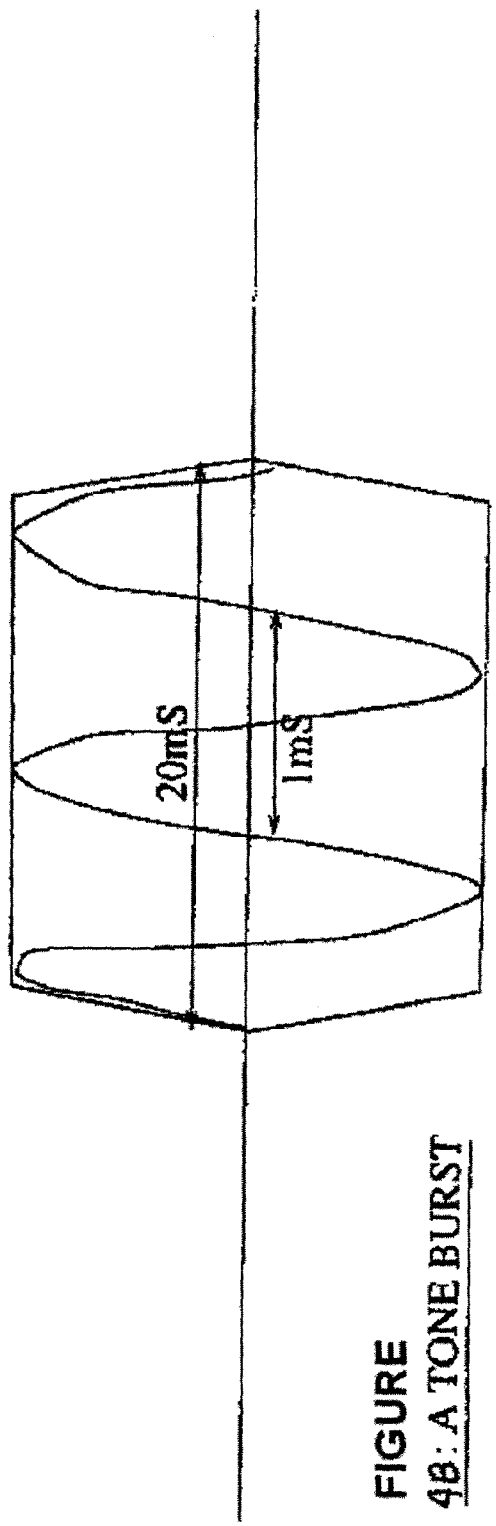
FIGURE 4B: A TONE BURST

SYSTEM AND METHOD OF DETERMINING SHORT RANGE DISTANCE BETWEEN RF EQUIPPED DEVICES

FIELD OF THE INVENTION

The present invention relates to a system and method of determining whether two electronic devices are within close proximity of each other. More specifically, the present invention relates to a system and method of determining whether two electronic devices engaged in an electronic financial transaction are within close proximity of each other.

BACKGROUND OF THE INVENTION

A wireless portable communications device such as a mobile phone is equipped to transmit and receive data or voice via a cellular network and can also be equipped to exchange digitized data, which can represent speech or voice, via a short range radio link.

Various proposals for using mobile phones, RF equipped personal digital assistants (PDAs), or any other portable RF equipped communication device for that matter, as means to conduct financial transactions are being developed.

The basic idea is that a portable wireless communication device can communicate an electronic token representative of monetary value to another device suited to receive such an electronic token. The portable wireless communication device may be a mobile phone equipped with suitable security devices and software, and it communicates with a device, which may be a Point-of-Sale (POS) terminal or kiosk equipped with a short-range radio interface unit.

In particular, when a POS device attempts to communicate with a portable wireless communication device belonging to a customer standing in line, for instance, it is a useful security check for the portable wireless communication device to be able to verify that the signal it is receiving is from a nearby source, i.e. the POS device, and not from a more remote and perhaps fraudulent source.

What is needed is a system and method for verifying the proximity of a portable wireless communication device to a POS device. By ensuring that the two devices are within a certain proximity, it reduces the possibility of a fraudulent transaction occurring.

SUMMARY OF THE INVENTION

In an application where it is desirable to know the approximate distance between communicating devices employing a short range radio link, one device transmits a digitized data message using the short range radio link followed by digital data representing a digitized acoustic signal, such as a tone. Simultaneously, or with a predetermined time delay, the transmitting device emits an acoustic version of the same signal using an acoustic transducer such as a loudspeaker. The receiving device receives the data message and the digitized acoustic signal via the short range radio link and receives the acoustic version of the signal via a microphone, which converts the acoustic signal to a second digitized version of the acoustic signal.

Digital signal processing circuits then correlate the second digitized signal received acoustically with the digitized acoustic signal received over the short range radio link to determine a time difference of arrival between the two signals. The time difference is corrected for any predetermined delay(s) between the radio and the acoustic signal emissions at the transmitter and predetermined processing delay(s) in the receiver. Once a corrected time delay is determined, the receiving device can determine its distance from the transmitting device using the difference between the speed of sound and the speed of radio propagation.

BRIEF DESCRIPTION OF THE DRAWINGS

FIG. 2 illustrates a system arrangement according to the present invention.

FIG. 4a illustrates a two-tone ranging waveform suitable for use with the present invention.

FIG. 4b illustrates a tone burst ranging waveform suitable for use with the present invention.

DETAILED DESCRIPTION OF THE INVENTION

Figure 1:
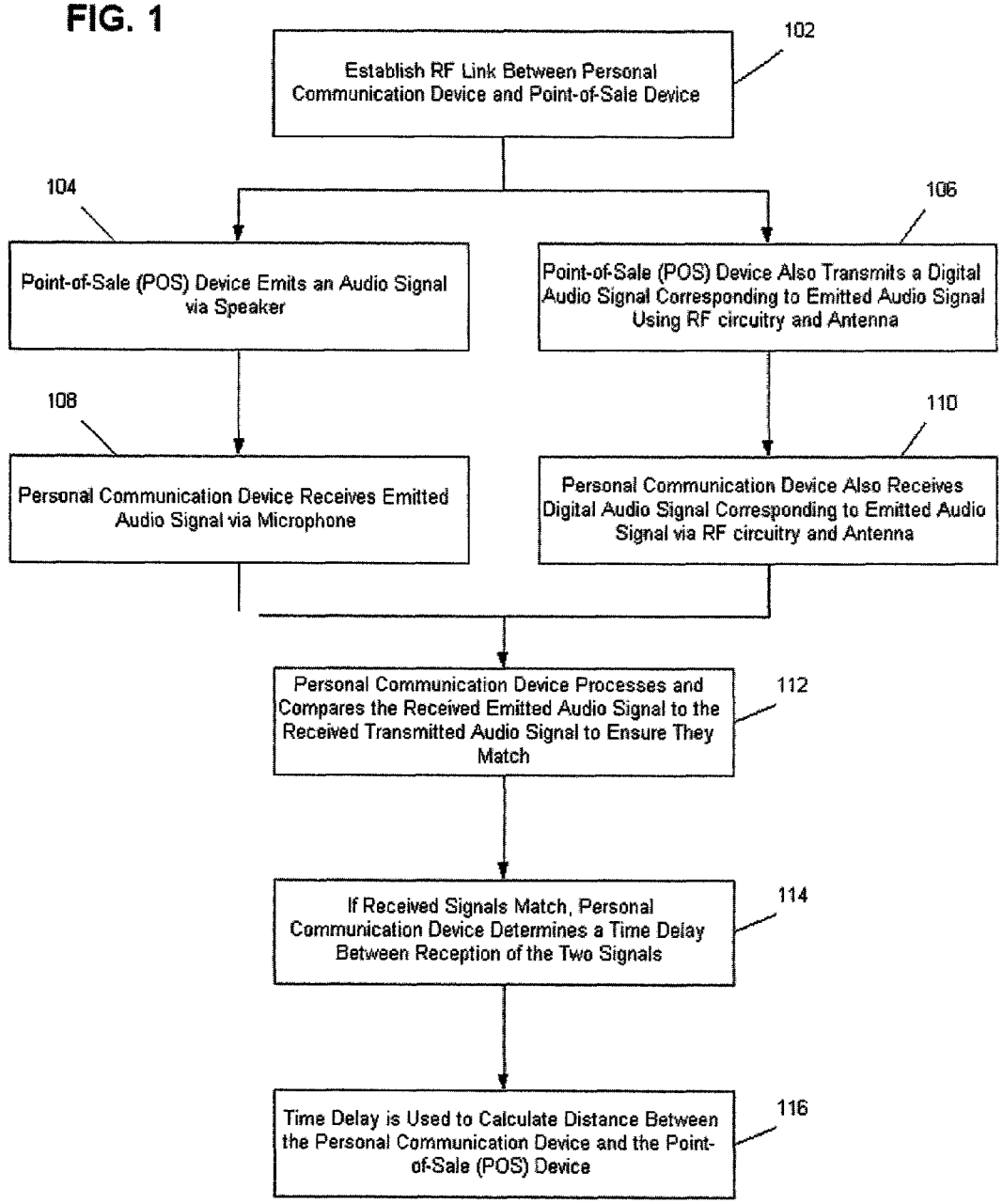
FIG. 1 is a flowchart that describes a method of measuring the distance between a pair of compatible RF equipped devices.

FIG. 1 is a flowchart that describes a method of measuring the distance between a pair of compatible RF equipped devices according to the present invention. Initially, an RF link between two compatible devices is established 102. For purposes of illustration, one device shall be referred to as a point-of-sale (POS) device while the other device shall be referred to as a portable wireless communication device. A particularly suitable RF link for purposes of the present invention is the Bluetooth™ protocol since it is specifically designed for short range wireless communications between similarly equipped devices. The Bluetooth™ protocol allows Bluetooth™ equipped devices to passively sense one another when one device nears another. Upon sensing the existence of another Bluetooth™ equipped device, a handshake occurs and the two devices may then exchange data.

Upon establishment of an RF link between the POS device and the portable wireless communication device, the POS device emits 104 an audio signal via a speaker while simultaneously (or nearly simultaneously) transmitting 106 a digitized version of the audio signal. The portable wireless communication device receives both the emitted audio signal 108 (via a microphone) and the transmitted signal 110 (via an RF module). Both signals are then passed to a processor within the portable wireless communication device for processing. The processing includes digitizing the received audio signal from the microphone and comparing 112 it to the received signal from the RF module. If the signals match, then the portable wireless communication device determines the time delay between the arrival of the signals 114 after correcting for any predetermined transmission or reception delays. The time delay is then used to calculate the distance between the POS device and the portable wireless communication device 116. This is a relatively simple step since the speed of sound and the speed of radio wave propagation is known. Distance (d=v*t) can be solved for using simple algebra since time and velocity (speed) are known.

FIG. 2 illustrates an arrangement for practicing the present invention. A point-of-sale (POS) device 202 is connected to (or houses) a radio-acoustic interface unit 204. Radio-acoustic interface unit 204 is able to automatically transmit a radio signal via antenna 210 as well as emit an acoustic signal via loudspeaker 206 and pick up an acoustic signal via microphone 208. Similarly, a portable wireless communication device 212 is able to automatically receive a radio signal via antenna 122. Portable wireless communication device 212 is also able to transmit a radio signal via antenna 218 as well as emit an acoustic signal via loudspeaker 214 and pick up an acoustic signal via and microphone 216.

The short range radio link between antennas 210 and 218 may be a bi-directional radio link using the Bluetooth™ standard, which employs Time-Division-Duplex alternate bursts in alternating directions and pseudo-random frequency hopping to provide interference tolerance from other devices operating in nearby frequencies. The Bluetooth™ short range link is able to exchange digital messages between attached processors as well as digitized audio data. The digitized audio data is coded as 64 kilobit Continuously Variable Slope Delta (CVSD) modulation which provides more graceful degradation in the presence of errors than 64 kilobit pulse code modulation (PCM). Audio signals may first be available as PCM, but are converted to CVSD for transmission and reconverted to PCM upon reception. PCM audio signals may also be converted to analog audio signals and vice-versa with the aid of standard PCM Coder/Decoder (CODEC) circuitry.

Thus, radio-acoustic interface unit 204 can emit a Bluetooth™ radio signal bearing digital acoustic information and can emit an acoustic signal from loudspeaker 206 based on the same acoustic information. Portable wireless communication device 212 can receive a Bluetooth™ radio signal bearing digital acoustic information and can simultaneously (or nearly simultaneously) receive an acoustic signal via microphone 216 based on the same acoustic information, and convert both to a common PCM form. A processor within portable wireless communication device 212 receives both PCM forms of the same acoustic information and correlates the two PCM sample sequences to determine a relative phase or delay. The relative phase or delay may then be converted to a distance if desired before being compared to a threshold to verify the proximity of radio-acoustic interface unit 204, thus guarding against an undesired response to signals from a more remote source.

Figure 3:
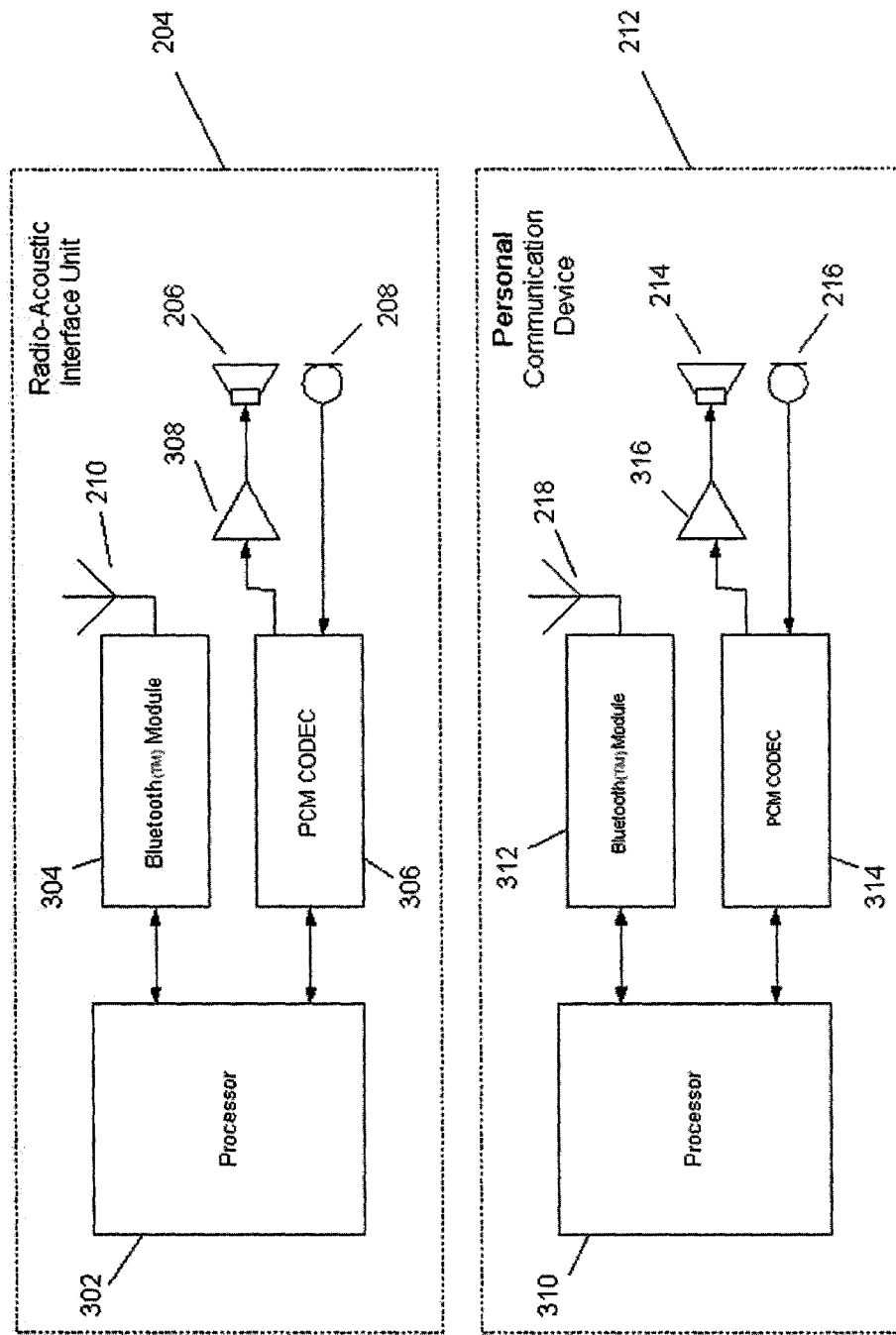
FIG. 3 illustrates a block diagram of the RF components and processing occurring within a radio-acoustic interface unit and a personal communications device.

Referring to FIG. 3, A control processor 302 which may reside in a POS device 202 or be part of radio-acoustic interface unit 204 is attached to a Bluetooth™ module 304 and antenna 210, and a PCM CODEC 306. The output of PCM CODEC 306 is amplified by audio amplifier 308 to drive loudspeaker 206. A microphone 208 can also be included in order to pick up audio acoustic signals.

Similarly, portable wireless communication device 212 comprises a processor 310 connected to a Bluetooth™ module 312 and a PCM CODEC 314. PCM CODEC 314 converts analog audio signals from a microphone 216 to digital form. An amplifier 316 and loudspeaker 214 combination is also included for emitting audio acoustic signals.

The Bluetooth™ equipped devices have the ability to exchange initialization messages in order to discover each other's presence and establish an ad-hoc link according to the Bluetooth™ published standard. The ad-hoc link can comprise the transmission of real-time digital audio signals with a fixed delay. The fixed delay is achieved by not employing Acknowledgement Request (ARQ) overhead signaling or packet retransmission for corrupted speech packets. Instead, such errors are simply tolerated. Other digital overhead messages not tolerant of such errors, however, utilize ARQ to guarantee error-free delivery.

The present invention establishes a digital audio link between a processor 302 within radio-acoustic interface unit 204 and a processor 310 within portable wireless communication device 212 so that PCM audio samples originating in one processor are conveyed to the other with a known delay. When the Bluetooth™ link is established, the same PCM audio samples are output from processor 302 to a PCM CODEC 306 and are then amplified, if necessary, by amplifier 308 and emitted as an acoustic signal from loudspeaker 206. The acoustic signal is picked up by microphone 216 within portable wireless communication device 212 and converted to PCM samples by CODEC 314 and input to processor 310.

Thus, processor 310 receives the same audio signal by a Bluetooth™ module 312 and by the acoustic link. The former has propagated from antenna 210 to antenna 218 at the speed of light while the latter has propagated from loudspeaker 206 to microphone 216 at the speed of sound. By comparing the PCM samples received at processor 310 via the radio route and the acoustic route to determine a relative time delay, the distance between the radio-acoustic interface unit 204 and portable wireless communication device 212 can be determined.

If, for instance, 8 kilosamples per second PCM is used, and the relative delay is determined with a resolution of 1 PCM sample or 125 $\mu$S, that corresponds to a distance resolution of approximately 1.5 inches.

To resolve ambiguity, the acoustic signal can be constructed as a multi-tone signal or as a series of tones. A single 1 KHz tone has an ambiguity of multiples of one foot approximately, while a 1.1 KHz tone would have an ambiguity of multiples of 13.2 inches approximately. By using both tones either together or in sequence, the ambiguity distance can be increased by a factor of 10.

Another method to resolve ambiguity is to use tone bursts and to compare the rise and fall envelopes of the tone bursts to determine a coarse delay, while using the tone period to determine a fine delay. FIGS. 4a and 4b illustrate that these waveform ambiguities may be resolved by comparing the larger features of the beat envelope of the two-tone signal or the envelope of the tone burst while resolution is obtained by comparing the zero crossings of the tone waveform, for example.

Both the radio-acoustic interface unit 204 and the portable wireless communication device 212 can be calibrated to determine fixed delays. The radio-acoustic interface unit 204 can be operated with a "reference portable device" of standard delay and deviations from a standard delay would be determined and programmed into memory in order to correct manufacturing spreads. Likewise, portable wireless communication device 212 can be operated against a reference portable device to determine deviation from a standard delay which would also be programmed into memory. If necessary, portable wireless communication device 212 and the radio-acoustic interface unit 204 can exchange such calibration factors in non-real time via Bluetooth™ packet overhead messages.

Once the distance between the portable wireless communication device 212 and the radio-acoustic interface unit 204 has been determined, decisions pertaining to transactions between the two devices can be processed. For instance, if the distance is greater than a threshold value, then further processing can be aborted. Such processing could include terminating a proposed financial transaction if the distance is greater than a threshold value.

The short-range radio-acoustic determination system and method described herein may also be applied to the reverse direction, i.e. when the POS device wishes to verify the proximity of a portable wireless communication device.

The invention described may have applications outside of e-commerce that can be developed by a person skilled in the art using the above teachings. Such adaptations are considered to fall within the spirit and scope of the invention if described by any of the attached claims.

The present invention is described herein in the context of a portable wireless communications device. As used herein, the term "portable wireless communications device" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Portable wireless communications devices may also be referred to as "pervasive computing" devices.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of determining the distance between a portable wireless communication device and an RF equipped Point-of-Sale device based on propagation delay between a pulse code modulation (PCM) RF signal and an acoustic signal that are emitted from the portable wireless communication device and received by the RF equipped Point-of-Sale device, the method comprising:
   establishing an RF link between the portable wireless communication device and the RF equipped Point-of-Sale device;
   in the portable wireless communication device:
   creating a multi-tone acoustic signal in the form of PCM modulated first digital audio samples;
   transmitting the PCM modulated first digital audio samples via the RF link;
   converting the PCM modulated first digital audio samples to an analog audio waveform such that the analog audio waveform is the acoustic equivalent of the PCM modulated first digital audio samples;
   acoustically emitting the analog audio waveform via a loudspeaker; in the RF equipped Point-of-Sale device:
   receiving the PCM modulated first digital audio samples via the RF link;
   receiving the analog audio waveform via a microphone;
   converting the analog audio waveform to PCM modulated second digital audio samples;
   comparing the PCM modulated first digital audio samples against the PCM modulated second digital audio samples to determine if they match, and if the PCM modulated first digital audio samples match the PCM modulated second digital audio samples, then
   determining the distance between the portable wireless communication device and the RF equipped Point-of-Sale device based on the known speed of propagation of radio waves, the known speed of sound, and the time difference between the arrival of the PCM modulated first digital audio samples and the acoustic signal.

2. The method of claim 1 wherein the RF link is Bluetooth™.

3. The method of claim 1 further comprising terminating an exchange of further radio messages between the portable wireless communication device and the RF equipped Point-of-Sale device if the distance between the two devices is greater than a threshold value.

4. The method of claim 1 further comprising terminating the performance of a financial transaction if the distance determined is greater than a threshold value.

5. In a portable wireless communication device, a method of determining the distance between the portable wireless communication device and a RF equipped Point-of-Sale device, the RF equipped Point-of-Sale device capable of emitting a multi-tone acoustic signal and transmitting a pulse code modulation (PCM) radio signal that is a digitized version of the multi-tone acoustic signal, the method comprising:
   receiving the digitized version of the multi-tone acoustic signal in the form of PCM modulated first digital audio samples via an RF link;
   receiving the multi-tone acoustic signal via a microphone;
   converting the received multi-tone acoustic signal to PCM modulated second digital audio samples;
   comparing the PCM modulated first digital audio samples against the PCM modulated second digital audio samples to determine if they match, and if the PCM modulated first digital audio samples match the PCM modulated second digital audio samples, then
   determining the time difference between the arrival of the PCM modulated first digital audio samples and the multi-tone acoustic signal; and determining the distance from the RF equipped Point-of-Sale device based on the known speed of propagation of radio waves, the known speed of sound, and the time difference between the arrival of the PCM modulated first digital audio samples and the multi-tone acoustic signal.

6. The method of claim 5 wherein the RF link is Bluetooth™.

7. A portable wireless communication device capable of determining the distance between itself and a RF equipped device wherein the RF equipped Point-of-Sale device emits a multi-tone acoustic signal and transmits a corresponding pulse code modulation (PCM) radio signal in the form of first digital audio samples, the portable wireless communication device comprising:

an RF module that receives the PCM modulated first digital audio samples via an RF link;

a microphone that receives the multi-tone acoustic signal;

a CODEC that converts the received multi-tone acoustic signal to PCM modulated second digital audio samples; and a processor that:

compares the PCM modulated first digital audio samples against the PCM modulated second digital audio samples to determine if they match, and if the PCM modulated first digital audio samples match the PCM modulated second digital audio samples, then determines the time difference between the arrival of the PCM modulated first digital audio samples and the multi-tone acoustic signal; and determines the distance from the RF equipped Point-of-Sale device based on the known speed of propagation of radio waves, the known speed of sound, and the time difference between the arrival of the PCM modulated first digital audio samples and the multi-tone acoustic signal.

8. The portable wireless communication device of claim 7 wherein the RF link is Bluetooth™.

* * * * *